United States Patent
Smith (10) Patent No.: US 10,380,687 B2
(45) Date of Patent: Aug. 13, 2019

(54) TRADE SURVEILLANCE AND MONITORING SYSTEMS AND/OR METHODS

(71) Applicant: Software AG, Darmstadt (DE)

(72) Inventor: Gareth Smith, Waterbeach (GB)

(73) Assignee: SOFTWARE AG, Darmstadt (DE)

( * ) Notice: Subject to any disclaimer, the term of this patent is extended or adjusted under 35 U.S.C. 154(b) by 1216 days.

(21) Appl. No.: 14/457,365

(22) Filed: Aug. 12, 2014

(65) Prior Publication Data
US 2016/0048914 A1    Feb. 18, 2016

(51) Int. Cl.
*G06Q 40/04* (2012.01)

(52) U.S. Cl.
CPC ................... *G06Q 40/04* (2013.01)

(58) Field of Classification Search
CPC .................................................. G06Q 40/04
USPC ...................................................... 705/35–45
See application file for complete search history.

(56) References Cited

U.S. PATENT DOCUMENTS

| | | | |
|---|---|---|---|
| 5,925,108 A | 7/1999 | Johnson | |
| 6,367,034 B1 | 4/2002 | Novik et al. | |
| 6,438,618 B1 | 8/2002 | Lortz et al. | |
| 6,480,826 B2 | 11/2002 | Pertrushin | |
| 7,426,736 B2 | 9/2008 | Cole et al. | |
| 8,095,613 B1 | 1/2012 | Perkowitz | |
| 8,214,308 B2 | 7/2012 | Chu | |
| 8,484,472 B2 | 7/2013 | Sherkin et al. | |
| 8,554,457 B2 | 10/2013 | White et al. | |
| 8,635,105 B2 | 1/2014 | Pradeep | |
| 8,683,348 B1 | 3/2014 | Blank | |
| 8,939,903 B2 * | 1/2015 | Roberts | A61B 5/165 600/300 |
| 8,977,573 B2 | 3/2015 | Daya | |
| 9,075,668 B1 * | 7/2015 | Hushon | G06F 9/54 |
| 9,613,362 B2 * | 4/2017 | Lorentzen | G06Q 30/0201 |
| 9,619,765 B2 * | 4/2017 | Lorentzen | G06Q 10/063 |
| 2002/0026484 A1 | 2/2002 | Smith | |
| 2002/0120559 A1 | 8/2002 | O'Mara et al. | |
| 2002/0161604 A1 | 10/2002 | Kardos | |
| 2003/0103501 A1 | 6/2003 | Clem | |

(Continued)

FOREIGN PATENT DOCUMENTS

| | | |
|---|---|---|
| EP | 1 355 232 | 10/2003 |
| WO | 2013/118141 | 8/2013 |

OTHER PUBLICATIONS

Beggs, Lance, "Biofeedback for Trader Psychology", Jun. 8, 2012, Your Trading Coach.*

(Continued)

*Primary Examiner* — Bruce I Ebersman
(74) *Attorney, Agent, or Firm* — Nixon & Vanderhy PC (57) ABSTRACT

Certain example embodiments relate to trade surveillance and monitoring systems and/or methods that take into account both subjective physical trader emotional attributes, and objective activity measures (e.g., trading activity, financial market activity, etc.). Detect scenarios (which may be thought of as logical sequences that define types or patterns used in detecting unwanted incidents) and context scenarios (which may be thought of as logical sequences that help provide additional context in the investigation stage of an incident) may be defined to take into account such information and be used in these and/or regards.

24 Claims, 4 Drawing Sheets

(56) References Cited

U.S. PATENT DOCUMENTS

| | | |
|---|---|---|
| 2003/0118974 A1 | 6/2003 | Obrador |
| 2003/0135575 A1 | 7/2003 | Marejka |
| 2003/0140139 A1 | 7/2003 | Marejka |
| 2004/0001616 A1 | 1/2004 | Gutta |
| 2004/0210159 A1* | 10/2004 | Kibar ............... A61B 5/4803 600/558 |
| 2005/0004862 A1* | 1/2005 | Kirkland ............ G06Q 10/10 705/38 |
| 2005/0096958 A1* | 5/2005 | Rice .................. G06Q 10/04 706/47 |
| 2005/0183143 A1* | 8/2005 | Anderholm ........ G06F 11/32 726/22 |
| 2006/0064464 A1 | 3/2006 | Kakivaya |
| 2006/0215023 A1 | 9/2006 | Coonce |
| 2007/0033050 A1 | 2/2007 | Asano |
| 2007/0118545 A1 | 5/2007 | Chandrasekharan et al. |
| 2007/0260569 A1* | 11/2007 | Biger ................. G06N 5/025 706/47 |
| 2008/0040110 A1* | 2/2008 | Pereg ................. G10L 17/26 704/236 |
| 2008/0062881 A1 | 3/2008 | Martin |
| 2008/0109824 A1 | 5/2008 | Chen |
| 2008/0196006 A1* | 8/2008 | Bates ................. G06F 9/542 717/109 |
| 2009/0125550 A1* | 5/2009 | Barga ................. G06F 9/542 |
| 2009/0265336 A1* | 10/2009 | Suntinger .......... G06F 17/30985 |
| 2009/0285456 A1 | 11/2009 | Moon |
| 2010/0037187 A1* | 2/2010 | Kondziela ......... G06F 3/011 715/866 |
| 2010/0161362 A1 | 6/2010 | Shapira et al. |
| 2010/0194560 A1 | 8/2010 | Hojecki et al. |
| 2011/0091847 A1 | 4/2011 | Carroll |
| 2011/0206198 A1* | 8/2011 | Freedman ......... G06Q 30/06 379/265.03 |
| 2011/0250972 A1* | 10/2011 | Horbay .............. G06Q 10/10 463/42 |
| 2011/0276396 A1 | 11/2011 | Rathod |
| 2012/0030138 A1* | 2/2012 | Altomare .......... G06Q 40/06 705/36 R |
| 2012/0084317 A1* | 4/2012 | Sakamoto .......... G06Q 40/04 707/769 |
| 2012/0185877 A1 | 7/2012 | Mcguire et al. |
| 2012/0233051 A1* | 9/2012 | Sheldon ............. G06Q 40/04 705/37 |
| 2012/0254084 A1 | 10/2012 | Richter et al. |
| 2012/0278176 A1 | 11/2012 | Naor |
| 2012/0331003 A1 | 12/2012 | Chu-Carroll |
| 2013/0018702 A1 | 1/2013 | Smith et al. |
| 2013/0110745 A1* | 5/2013 | Zhang ................ G06Q 10/00 706/12 |
| 2013/0191263 A1* | 7/2013 | Nakae ................ G06Q 40/06 705/37 |
| 2013/0191520 A1 | 7/2013 | Khouri |
| 2013/0305357 A1* | 11/2013 | Ayyagari ........... H04W 12/06 726/22 |
| 2013/0346067 A1 | 12/2013 | Bhatt |
| 2014/0095150 A1 | 4/2014 | Berjikly |
| 2014/0146683 A1 | 5/2014 | Stogner |
| 2014/0163960 A1 | 6/2014 | Dimitriadis |
| 2014/0257820 A1* | 9/2014 | Laperdon ........... G10L 25/63 704/270 |
| 2014/0324959 A1 | 10/2014 | Hudson |
| 2014/0365334 A1 | 12/2014 | Hurewitz |
| 2015/0112912 A1* | 4/2015 | Lorentzen .......... G06N 5/04 706/45 |
| 2015/0112913 A1* | 4/2015 | Lorentzen .......... G06N 5/04 706/46 |
| 2015/0112914 A1* | 4/2015 | Lorentzen .......... G06N 5/04 706/46 |
| 2015/0112916 A1* | 4/2015 | Lorentzen .......... G06Q 10/063 706/47 |
| 2015/0112917 A1* | 4/2015 | Lorentzen .......... G06Q 30/0201 706/47 |
| 2015/0235655 A1 | 8/2015 | Dimitriadis |
| 2015/0356349 A1 | 12/2015 | Govindarajeswaran |
| 2015/0356675 A1* | 12/2015 | Schulz ............... G06Q 40/04 705/37 |
| 2015/0379355 A1 | 12/2015 | Kanga |
| 2016/0012530 A1* | 1/2016 | Gardner ............. G06Q 40/04 705/37 |
| 2016/0019608 A1 | 1/2016 | Smith |
| 2017/0046566 A1 | 2/2017 | Smith et al. |

OTHER PUBLICATIONS

Griffiths, Sarah, "Cars could soon monitor our EMOTIONS: Device reads facial expressions to prevent road rage", Mar. 14, 2014, Daily Mail via dailymail.com.*

Fenton-O'Creevy, Mark et al., "Emotion Regulation and Trader Performance", May 2011, presented at 15th conference of the European Association of Work and Organizational Psychology, Maastricht, The Netherlands.*

Fenton-O'Creevy, Mark et al., "Thinking, feeling and deciding: The influence of emotions on the decision making and performance of traders", Published online Jul. 26, 2010 in Wiley Online Library, Journal of Organizational Behavior, J. Organiz. Behav. 32, 1044-1061 (2011).*

Lo, Andrew W. et al., "The Psychophysiology of Real-Time Financial Risk Processing", Copyright 2001, Nber Working Paper Series: Working Paper 8505.*

Khazan, Olga, "This App Reads Your Emotions on Your Face", Jan. 15, 2014, The Atlantic.*

Innovation world presentation re: real time analytics 30 pages 2013 (Year: 2013).*

Liljana Stojanovic et al., "Real-Time Monitoring of Web-Based Processes: A Use Case for the Event-Driven Advertisement," Business Process Management Workshops, BPM 2010 Workshops and Education Track, Hoboken, NJ, Copyright 2011, pp. 719-729.

Nice.com—Proactive Security, Situation Management and IP-Based Surveillance, retrieved Oct. 14, 2014, 1 page. http://www.nice.com/transportation/airports.

Robin Gilthorpe, "Big Fast Data World," Software AG, Innovation World, Oct. 9, 2013, pp. 1-30.

U.S. Appl. No. 14/515,663, filed Oct. 16, 2014, Gareth Smith et al.

U.S. Appl. No. 14/332,421, filed Jul. 16, 2014, Gareth Smith.

* cited by examiner

Fig. 4

TRADE SURVEILLANCE AND MONITORING SYSTEMS AND/OR METHODS

TECHNICAL FIELD

Certain example embodiments described herein relate to trade surveillance and monitoring systems and/or methods. More particularly, certain example embodiments described herein relate to trade surveillance and monitoring systems and/or methods that take into account both subjective physical trader emotional attributes, and objective activity measures such as, for example, trading activity, financial market activity, etc.

BACKGROUND AND SUMMARY OF EXAMPLE EMBODIMENTS

The global financial system involves trillions of dollars, and the lives and fortunes of millions depend on its overall integrity. Trade surveillance and monitoring (TSM) systems are commonplace within financial institutions and in many cases exist because of legal and regulatory demands. In general, a TSM system at an institution helps monitor the trading activity of that institution's employees, e.g., to ensure that their trading activity adheres to trading rules and regulations. For instance, TSM systems generally try to identify, and sometimes seek to prevent, illicit trading activity. Illicit trading activity in this sense can include manipulation of the financial markets, abuse of the organization's internal inventory, off-exchange collusion, misuse of reporting and auditing systems, and/or the like, and can include the behavior of so-called "rogue traders." Such illicit activity sometimes can subject both individual traders and the officers within an organization to civil and criminal liability, precisely because the impact of market abuses might be so widely felt.

Monitoring of actions may take place over a variety of different communication channels such as, for example, actions that take place with respect to electronic markets, social media, telephony, chat systems, email, etc. Some existing trade surveillance and monitoring systems monitor one or more of these systems to try to ascertain whether there is any explicit illegal activity or (more often) whether there is a situation that requires further "off-line" or after-the-fact analysis. An assessment of wrongdoing could trigger internal probes, criminal investigations, civil lawsuits, and/or the like.

Although the identification of illicit behavior via off-line or after-the-fact analysis and subsequent enforcement action against those deemed responsible may help improve the integrity of financial markets and/or the like over time (e.g., by serving as a deterrent), it will be appreciated that it would be desirable to develop more real-time detection techniques. It furthermore would be desirable to develop and implement more real-time response strategies. For instance, by identifying potential risks in real-time, not only can illicit trades be prevented, but such activities might not be able to impact the market and thus affect every other trader and trading venue worldwide. Indeed, even if potential problems are detected in real-time, if bona fide wrongdoing takes place, the effects on the market are potentially unforeseeable and irreversible, e.g., because it is not possible to "undo" a day's worth of trades, "re-form" the subjective impressions caused by fraudulent activities, etc. The potential impacts of wrongdoing thus can be both subtle and explicit, with both potential impact types being difficult or even impossible to unwind.

Certain example embodiments extend existing trade surveillance and monitoring solutions, e.g., to encompass real-time and non-real-time detection, analysis, and/or resolution techniques. For instance, certain example embodiments implement systems and/or methods that continually and passively monitor the emotional states of traders to help identify illicit behavior from information streams not accessible or identifiable by existing systems. This more subjective information may be derived from visual surveillance systems, social media feeds, email messages, physiological monitors, etc., and it may be considered in connection with other more objective information such as, for example, trading activity, financial market activity, etc. Certain example embodiments additionally provide real-time responses to real-time problem cases.

In certain example embodiments, a surveillance system is provided. The system includes processing resources including at least one processor, a first interface over which quantified representations of inferred emotional states of one or more individuals are electronically receivable, and a second interface over which representations of activities undertaken by one or more individuals are electronically receivable. The processing resources are configured to at least: dynamically perform a set of first pre-programmed scenarios in real-time as events continue to stream into the system via the first and second interfaces to determine whether an incident might be occurring and/or might have occurred, with each said first scenario being implemented as a logic sequence that takes into account at least an aspect of a representation of an activity and/or an aspect of a representation of an inferred emotional state, and with at least one of said first scenarios taking into account both an aspect of a representation of an activity undertaken by at least one given individual and an aspect of a representation of an inferred emotional state of the at least one given individual; and dynamically generate a real-time alert message and/or at least temporarily halt an action before it can be completed, in response to a determination that a given incident might be occurring and/or might have occurred with a likelihood greater than a predetermined threshold.

In certain example embodiments, a method of conducting surveillance in connection with a computer system that monitors trades made by individuals in connection with at least one market is provided. Quantified representations of inferred emotional states of one or more of the individuals are received over a first electronic interface of the computer system. Representations of activities undertaken by one or more of the individuals are received over a second electronic interface of the computer system. Using at least one processor, a set of first predefined scenarios is dynamically performed in real-time as events continue to stream in to the computer system via the first and second interfaces, to determine whether an illicit incident might be occurring and/or might have occurred in connection with the trades, with each said first scenario being representable as program logic that includes at least an aspect of a representation of an activity and/or an aspect of a representation of an inferred emotional state, with at least one of said first scenarios including both an aspect of a representation of an activity undertaken by at least one given individual and an aspect of a representation of an inferred emotional state of the at least one given individual, and with the first scenarios being stored to a non-transitory computer readable storage medium. A real-time electronic message is dynamically generated in response to a determination that a given illicit incident might be occurring and/or might have occurred with a likelihood greater than a predetermined threshold.

According to certain example embodiments, the processing resources may be further configured to at least perform, in dependence on a determination that a given incident might be occurring and/or might have occurred, a set of second pre-programmed scenarios to determine with greater certainty whether the given incident might be occurring and/or might have occurred, with each said second scenario being implemented as a logic sequence, and with the first and second scenarios being different from one another.

According to certain example embodiments, aspects of representations of activities may include trade-related activities themselves and/or results from computations applied thereto. Similarly, according to certain example embodiments, aspects of representations of inferred emotional states may include quantifications of perceived subjective emotional feelings including happiness, sadness, anger, shock, and/or agitation themselves, and/or results from computations applied thereto.

Non-transitory computer readable storage mediums tangibly storing instructions for performing the above-summarized and/or other approaches also are provided by certain example embodiments, as well as corresponding computer programs.

For instance, in certain example embodiments, there is provided a non-transitory computer readable storage medium tangibly storing instructions that, when executed, perform surveillance in connection with a computer system that monitors trades made by individuals in connection with at least one market by at least: enabling reception, over a first electronic interface of the computer system, of quantified representations of inferred emotional states of one or more of the individuals; enabling reception, over a second electronic interface of the computer system, of representations of activities undertaken by one or more of the individuals; dynamically performing a set of first predefined scenarios in real-time as events continue to stream in to the computer system via the first and second interfaces, to determine whether an illicit incident might be occurring and/or might have occurred in connection with the trades, each said first scenario being representable as program logic that includes at least an aspect of a representation of an activity and/or an aspect of a representation of an inferred emotional state, at least one of said first scenarios including both an aspect of a representation of an activity undertaken by at least one given individual and an aspect of a representation of an inferred emotional state of the at least one given individual; performing, in dependence on a determination that a given illicit incident might be occurring and/or might have occurred, a set of second predefined scenarios to determine with greater certainty whether the given illicit incident might be occurring and/or might have occurred, each said second scenario being representable as program logic, the first and second scenarios being different from one another; and dynamically generating a real-time alert message and/or at least temporarily halting an action before it can be completed, in response to a determination that a given illicit incident might be occurring and/or might have occurred with certainty greater than a predefined threshold.

In certain example embodiments, a trade surveillance system is provided. The system includes: processing resources including at least one processor, a first interface over which quantified representations of inferred subjective physical trader emotional attributes are electronically receivable, and a second interface over which objective trade-related activity events and associated measures are electronically receivable. The processing resources are configured to at least: perform in real-time first logical sequences that define respective types or patterns useful in detecting inappropriate trade-related incidents in connection with data types receivable over at least the first interface, using a complex event processing engine; perform in real-time second logical sequences that incorporate data types from the first and/or second interfaces to provide additional context in investigating incidents detected using the first logical sequences; and generate real-time messages and/or trade interrupt signals, responsive to the performance of the first and/or second logical sequences.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS

The trade surveillance and monitoring (TSM) techniques of certain example embodiments may help ensure both regulatory compliance and adherence to an organization's own guidelines, e.g., in real-time. Such TSM techniques may cover a wide variety of, and potentially all, aspects of trading. For instance, the TSM techniques of certain example embodiments may involve, for example:

Checking discrete or individual trades, e.g., to help ensure that individual trades are within a given price range (e.g., varying within a generally normal distribution from the market price), maximum and minimum volumes for each trade are limited (e.g., on a static or one-time basis, as computed from live markets and potentially across one or more organizations, etc.), and/or the like;

Running trading algorithms and/or assessing collections of trades, e.g., to limit a maximum frequency of trades, cap the maximum total number of trades in any given day, etc.;

Considering knowledge of "inside" events such as, for example, prior or future events that have financial aspects but that are not necessarily known, e.g., to comply with legislative and/or regulatory requirements that any knowledge of a future event that will impact financial markets cannot be leveraged prior to publication;

Managing risk, e.g., to perform a maximum combined risk evaluation based on open positions (e.g., unfilled orders in the market, current inventory, and intended future trades), or the like;

Limiting markets, e.g., to limit where trading can occur including, for example, both "dark" and "lit" venues or financial exchanges;

Restricting assets and instruments, e.g., to restrict the types of instruments that can be traded (e.g., equities, swaps, options, etc.), with optional further limitations on subsets or categories of such instruments (e.g., permitting all swaps other than credit default swaps);

Building in timing constraints, e.g., to limit when trading can occur;

Assessing inventory, e.g., to limit how much of a given instrument or class of instruments any one trader can own and/or be owed (long and/or short positions), factor in a "Profit & Loss" calculation (which may be thought of as an analytical measure that describes the current (real-time) profitability of all the assets associated with a trader or group of traders), etc.; and/or Running any other metrics or analytics, e.g., that help define the current state of trading.

In certain example embodiments, these objective monitors can be considered in connection with other discrete data sources such as, for example, chat room conversations, social media notifications, email messages, and/or other feeds. Messages left in various internal and public chat rooms, sent to/from individuals and/or traders, etc., may be considered in these regards.

It will be appreciated that the trade surveillance and monitoring techniques of certain example embodiments may incorporate detection and analysis aspects. In a detection aspect, data sources may be consulted to identify possibly suspicious trading behavior, which may be noted and filed for further analysis. In an analysis aspect, contextual information may be captured and packaged, e.g., once a possible problem has been identified. As alluded to above, some analysis may be performed off-line whereas other analysis may be considered in real-time, e.g., to identify whether a breach of regulations occurred.

Figure 1:
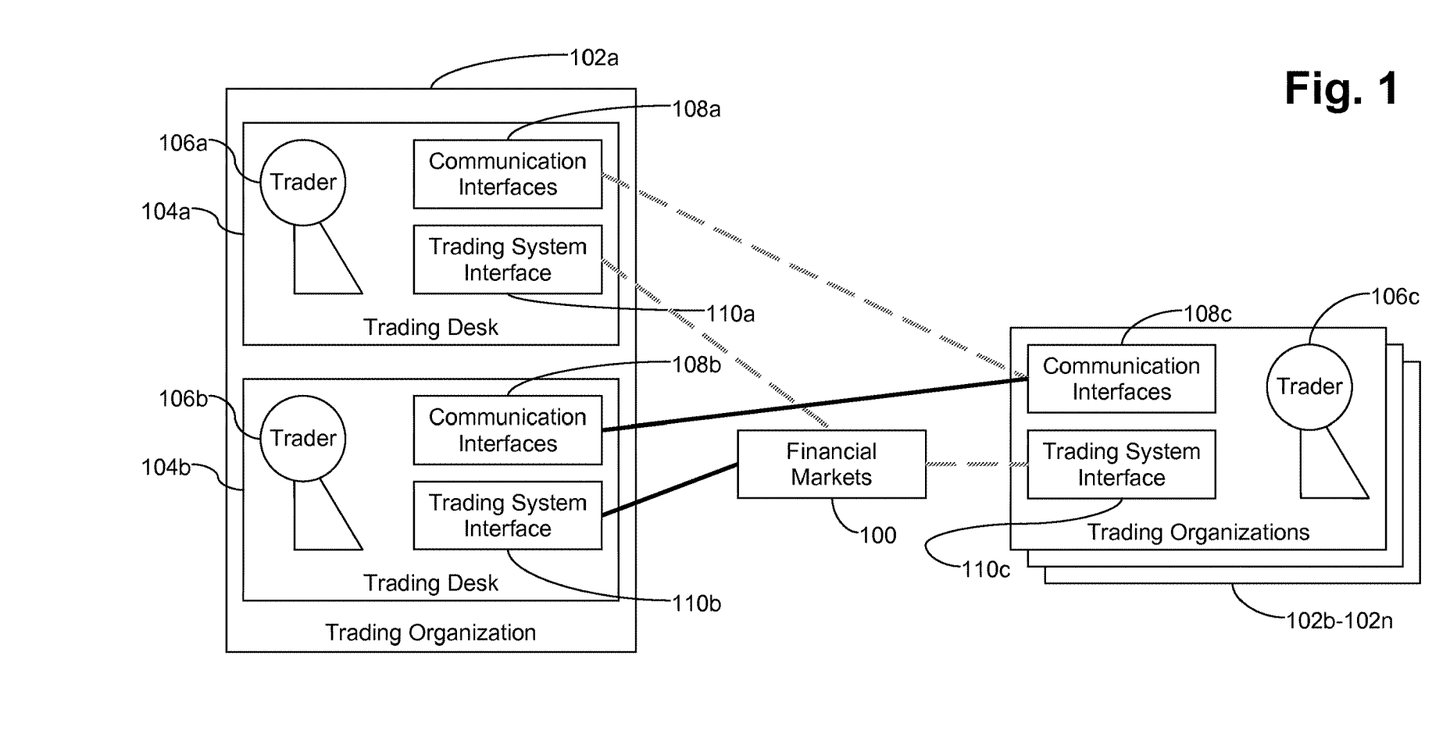
FIG. 1 is a schematic view of a trading environment including traders within a common organization and across organizations.

FIG. 1 is a schematic view of a trading environment including traders within a common organization and across organizations. In the context of the FIG. 1 example, financial markets 100 are influenced by trading organizations 102a-102n. The example first trading organization 102a includes first and second trading desks 104a-104b at which first and second traders 106a-106b trade. The traders 106a-106b have modern computer terminals, e.g., with communication interfaces 108a-108b that may allow them to place telephone calls, send email messages, post social media notifications (e.g., Tweets on Twitter, wall posts on Facebook, etc.), and/or the like. Trading system interfaces 110a-110b enable the traders 106a-106b to trade on the financial markets 100.

The TSM solutions of certain example embodiments may examine trade data, looking for unusual patterns of activity and among correlations data across disparate information sources. Some well-known patterns that indicate wrongdoing include wash trades, "trades that preempt major news announcements, 1, 2, 3, go" trading schemes, etc. In wash trades, for example, a trader will continually buy and sell the same instrument with no change in profit (or loss), with the intent being to generate a false sense of activity with or interest in a particular instrument that otherwise would be dormant. The preempting news pattern typically involves an unusual amount of trading activity shortly before a news announcement that subsequently leads to a profit for the trader, which might appear suspicious in the sense that the trader has capitalized on a future news event that the trader should not be aware of and/or should be ethically unable to act on.

In "1, 2, 3, go" trading, two or more traders collude in trading together over an exchange, but do so in synchronization so that their trades match (e.g., before anyone else in the market can react). Communications via telephone, SMS, social media, chat windows, and/or the like, may be used to synchronize activities. This pattern is hinted at in FIG. 1. That is, although the dashed lines show possible communication traffic between the parties and systems in the overall trading environment, the heavy solid lines indicate that there is collusion between the second trader 106b and the third trader 106c, such that the second trader 106b initiates a purchase via the trading system interface 110b and signals to the second trader 106c through communications between the second communication interface 108b and the third communication interface 108c that the third trader 106c should then execute an action via the third trading system interface 110c. This pattern may be detected by correlating the communications that take place between, and the actions undertaken by, the two parties 106b-106c, e.g., as a function of time and trading via the interfaces 110b-110c on the financial markets 100.

As technology and experience progress, illicit techniques tend to become more and more complex. New detection patterns can be developed to handle this increase in complexity but the development of new detection techniques itself can in some cases lead to more sophisticated illicit techniques being employed over time.

The inventor has realized that a common element in virtually all types of premeditated illicit trading schemes is the presence of a human trader. That is, while the technologies, instruments, markets, and algorithms may evolve, a trader is still at the head of the process and is a human. The inventor has also realized that although everything that traders do electronically is or can be monitored, the traders themselves are not necessarily monitored. The lack of human monitoring, in turn, creates an information gap. That is, the actual perpetrators (and their emotional states) currently are not taken into account when looking for illicit trading activities, e.g., in a real-time process. Certain example embodiments attempt to close this gap, e.g., by including indicia of emotional states of traders into real-time trade surveillance scenarios. It thus becomes possible to consider further information directly relevant to the single element in common with virtually all types of premeditated illicit trading schemes.

Certain example embodiments may use video feeds and video analysis technology to quantify emotional human behavioral traits of traders being observed. This quantified information may be used to provide a richer set of context for both the detection and analysis aspects of monitoring. With respect to detection, for example, certain human emotional states may help indicate possible illicit trading. For instance, if a trader is suddenly agitated and is no longer looking happy, while there also is a sudden change in trading behavior, such conditions might not be sufficient to trigger an investigation. With respect to analysis, for example, the behavior and/or how the behavior at the time of the incident compares to the behavior at other times may be used as additional context, e.g., when a detected incident is being investigated. For instance, consideration might be given to whether a trader's expression changed significantly at the exact time of the incident, or whether the trader was not at his/her desk or not looking at his/her screens, etc. An incident thus may refer to a specific moment or time period in which possible unwanted, illegal, unethical, illicit, or otherwise discouraged trading activity may have occurred. Further details are set forth below.

The real-time nature of certain example trade surveillance techniques disclosed herein is advantageous. That is, although a trader who trades illicitly can be reprimanded several hours, days, weeks, or even years after an inappropriate event occurs, the market manipulation will be complete and have an impact on other trading organizations, globally. Even if the impact is minor in terms of the overall system, it nonetheless might be significant on a more micro level, e.g., with possible impacts to inventors, companies, funders, and/or others. And such impacts may be known or unknown, in the short and/or long term(s). The impact cannot be unwound and has possible criminal implications for the chief risk and monitoring officers within these organizations. By being able to identify and potentially prevent illicit trades in real-time, certain example embodiments make it possible to identify the original culprit quickly and protect the global market.

Certain example embodiments may monitor the actions of individual traders within an institution, and/or correlate individual traders' activities across traders at the same and/or different institutions. This may, for example, help identify collusion between traders within and across organizations, e.g., by correlating their respective changes in emotional states and trading behaviors in real-time. Moreover, although the trading floor within any one organization may not be permitted to know of other institutional activity (e.g., as it may be seen as constituting insider trading), certain example embodiments may consider scenarios that involve collusion within an organization even though such auditing might otherwise not be allowed. For instance, certain example embodiments may consider whether there is collusion between parts of a bank that are supposed to remain on separate sides of a so-called "Chinese Wall."

It thus will be appreciated that certain example embodiments may provide for real-time monitoring, detection, and potential action, with respect to individual traders, traders within an institution, and traders across institutions. Certain example embodiments thus may be implemented at an individual trader level, an institutional level, a cross-institutional level, and possibly even a market-wide level in some cases.

Example Implementation and Scenarios

Figure 2:
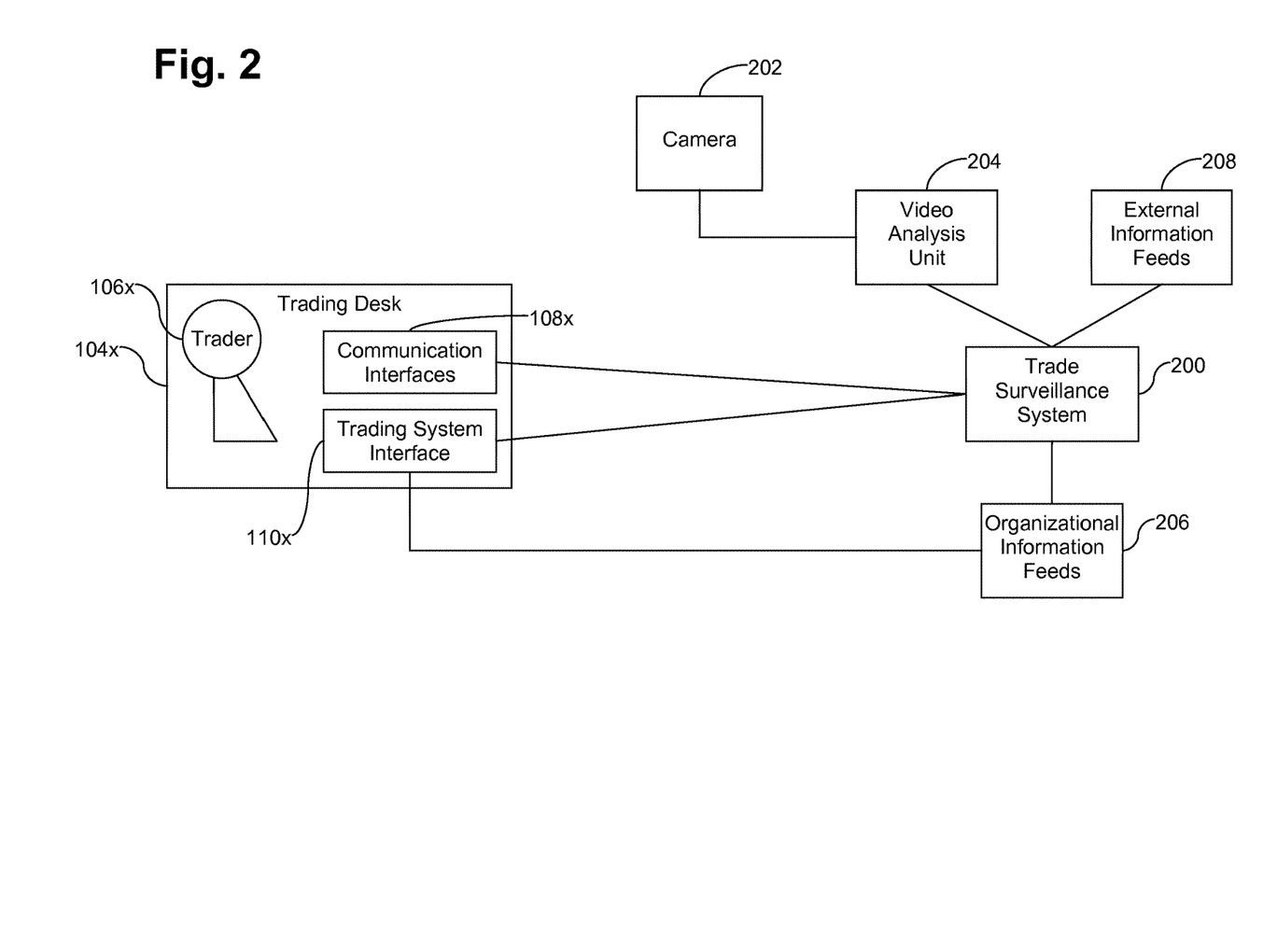
FIG. 2 is a block diagram showing how a trade surveillance and monitoring system of certain example embodiments may operate, e.g., in connection with a trading desk.

FIG. 2 is a block diagram showing how a trade surveillance and monitoring system 200 of certain example embodiments may operate, e.g., in connection with a trading desk 104$x$. As was the case in the FIG. 1 example, the trading desk 104$x$ is used by a trader 106$x$, who can communicate with the outside world via communication interfaces 108$x$ and make trades via the trading system interface 110$x$. The trade surveillance and monitoring system 200 may receive inputs from a variety of sources. Information may include, for example, information from the communication interfaces 108$x$ and the trading system interface 110$x$. As will be appreciated from the above, information from the communication interfaces 108$x$ may include the content of email messages, chat room conversations, social media messages (e.g., Tweets, posts, likes, etc.), and/or the like. It also may include information about telephone numbers that are dialed, how long telephone calls last, speech-to-text transcripts of telephone calls, websites that are visited, and/or the like. Information from the trading system interface 110$x$ may include, for example, information about specific trades that are made (e.g., identifiers, prices, volumes, times, purchasers, etc.).

The trader 106$x$ may be monitored by the camera 202. Video output from the camera 202 may be provided to the video analysis unit 204 (which may be separate from or integral with the trade surveillance and monitoring system 200 in different example embodiments). As alluded to above, and as described in greater detail below, the camera 202 and the video analysis unit 204 may be used to provide more subjective emotional-type data to the trade surveillance and monitoring system 200. In certain example embodiments, multiple cameras may be provided, e.g., such that each camera covers one desk, one trader, one group of traders, etc.

The video analysis unit of certain example embodiments may interpret each of the video feeds and generate a stream of information that attempts to quantify more qualitative (e.g., emotionally characterized) information from the video. The more qualitative data, once quantified, may be used to help describe an inferred emotional state of the traders. This may include indications of emotions, attentiveness, identification, and/or the like, which may be processed at a binary or more granular (e.g., fuzzy) level. Facial recognition, emotion sensing, and/or other software and/or systems may be used in this regard.

Organizational information feeds 206 may aggregate information from trading system interfaces from an organization's trading floor and pass along similar data to that indicated above to the trade surveillance and monitoring system 200. It additionally or alternatively may send to the trade surveillance and monitoring system 200 information about organization-wide announcements (e.g., buy/sell recommendations, industry reports, etc.). Organizational information feeds 206 may additionally or alternatively indicate which traders are involved in the business of trading (e.g., which traders are logged in and making trades, performing research, etc.), whether traders are present at their desks (e.g., based on input indicating whether they have called out sick received for instance from a human resources management system, have swiped in to/out of the building for lunch or the like), etc.

External information feeds 208 may be used to provide data to the trade surveillance and monitoring system 200 from other sources outside of the institution. Such information may include, for example, real-time quote information (e.g., from a streaming service that provides stock and/or other market quotes, etc.), news information (e.g., from a newswire service, the Associate Press, major and/or minor news outlets, etc.) press releases, and/or the like. External information feeds 208 may be used to provide public social media information gathered from traders and/or others, e.g., in the event that traders do not use the communication interfaces at their trading desks to interact with same.

As indicated above, certain example embodiments may process video streams to develop quantitative measures of more qualitative states of the traders. In certain example embodiments, the processing may help quantify indications of emotions, attentiveness, identification, and/or the like, which may be processed at a binary or more granular (e.g., fuzzy) level. Example emotions graded on a fuzzy scale of 0-100% may include, for instance:

Happy: A percentage that describes how happy the trader is (e.g., where 0% is an expressionless or a sad expression, and where 100% is a full smile);

Sad: A percentage that describes how sad the trader is (e.g., where "sad" is the inverse of or otherwise related to "happy"; where 0% is a full smile and 100% is tearing, wet, or red eyes; etc);

Angry: A percentage that describes how angry the trader is (e.g., based on skin tone and/or color, clenching of the jaw, throbbing of veins in the forehead, clenching of fists, pounding on tables, etc.);

Shocked: A percentage that describes how shocked the trader is (e.g., based on facial expressions); and/or Agitated: A percentage that describes how agitated the trader is (e.g., based on the volatility of the trader's movement within a seated position, whether the trader sits and stands frequently, etc.).

In a similar manner, attention or attentiveness may be calculated as a percentage that describes whether the trader is looking at his/her trading screens or elsewhere. This factor may taken into account eye lines, whether the trader is frequently on the telephone or sending text messages, using software other than trading software, etc. Identification also may be taken into account and quantified, e.g., as a percentage that describes the certainty of the image analysis tool that the trader in view is the trader who should be there.

Certain example trade surveillance and monitoring scenarios are set forth below, although it will be appreciated that these scenarios are illustrative in nature and that other scenarios may be defined and handled using the example techniques set forth herein. It also will be appreciated that the example scenarios are partitioned into scenarios that may actively detect new types of rogue or illicit trading behavior, and scenarios that add additional context to the incident that may be used to help determine its severity, whether action should be taken, etc. Certain example embodiments may handle detect and context scenarios.

As will become clearer from the more detailed description below, some scenarios may take into account aggregated emotional states that combine one or more of the raw feeds from the visual analysis system. Moreover, certain example embodiments may perform moving average calculations, e.g., to derive dynamic "baseline" and/or "gradient" values for such emotional data. In this sense, a baseline may be thought of as a medium-to-long term moving average calculation that may be used to denote a "normal" state or value for any quantitative value, and a gradient may be thought of as a measure of the rate by which a given value is changing (e.g., positive for increasing values, and negative for decreasing values). The baseline and/or gradient values may in some instances make it possible to compare the normal states and the rate of change in these states, e.g., for a given trader, a collection of traders within a given institution, a collection of traders across institutions, a collection of traders having certain predefined characteristics (e.g., demographic characteristics such as, for example, age, gender, experience, working shift, etc.), and/or others.

Aggregated states may include "anxiety" and "negativity" for example. Anxiety may, for example, be considered an aggregation of sadness, agitation, anger, and shock. Weights may be attached to or otherwise associated with these factors such that, for example, the anxiety aggregation is calculated as:

Anxiety=
  [Sadness*1.0*Agitated*1.25*Anger*0.75*Shock*0.5]/3.5

Similarly, negativity may be considered an aggregation of sadness, agitation, anger, and shock, but with different weights as compared to anxiety. In this regard, the negativity aggregation may be calculated as:

Negativity=
  [Sadness*1.5*Agitated*0.25*Anger*1.5*Shock*0.5]/3.75

Common analytics measures, such as baselines (which may be percentages from 0% to 100%) and gradients (which may be percentages from −100% to +100%, where 0% is a flat line) for each metric may be set over a defined time window. The time windows may be set by default in certain example embodiments (e.g., to 15 minutes) and/or customized for a particular context (e.g., by an authorized context definer). Thus, the "baseline(happy)" value may be defined as the 15-minute moving average of the happy value for a given trader, and the "gradient(happy)" value may be defined as the gradient of the 15-minute moving average of the happy value for the given trader.

An event-based system would be desirable in processing the high volumes of event-based data received from the wide range of sources and in responding thereto (e.g., in real-time). Indeed, the scenarios involved in illicit trading behavior may have associated latency requirements that could be quite demanding in many instances. Certain example embodiments might use a database approach of receiving data, storing it in a data store (e.g., a database) and, at some interval later, processing or querying the set of stored data. The interval in this two-step "load then query" process quite likely will, however, be longer than the time required to respond, e.g., in the context of electronic trading in financial markets. Thus, more traditional database approaches may be appropriate for the processing of some, but not all, of the incoming data, at least in certain example embodiments.

In contrast with more traditional database approaches, the event-based approach of certain example embodiments may execute continually running filters for specific event patterns, e.g., through the use of complex event processing (CEP) queries or the like. Data thus may be more immediately matched against a filter with little-to-no additional processing latency, e.g., as the data in essence is "flooded" over the scenarios/patterns in the event-based system. The use of an event-based system such as a CEP system or the like thus advantageously provides for massive performance scalability and low latency that is compatible with monitoring for and responding to illicit trading schemes. In certain example embodiments, and as suggested above, less critical information (e.g., long-term market trends, news media processing, etc.) may be processed using a more conventional database approach, whereas more rapidly changing emotional data, trade related data, etc., may be fed through a CEP system apart from or together with output from the database queries.

Certain example detect and context scenarios will now be discussed.

Example Detect Scenarios

Detect scenarios may be thought of as logical sequences that define types or patterns used in detecting unwanted incidents. Detect scenarios may, for example, detect new types of rogue or illicit trading behavior, e.g., in real-time, thereby helping to protect both the institution and global markets. Several example detect scenarios are set forth below, although it will be appreciated that other detect scenarios may be defined and implemented in different example embodiments. Each table reflects a different detect scenario that may be implemented, with the first row providing a description of the pattern and the possible problem and with the second row providing a simple pseudo-code implementation.

| A sudden dip in trader profit and loss (P&L) performance occurs with no negative emotion shown might suggest that the trader is hiding something: |
|---|
| For each trader:<br>P&L < 0.5 * Baseline (P&L)<br>AND<br>Negative within 10% of Baseline (Negative) |

| Extreme sad or shock emotions are detected with no significant change in P&L might indicate that the trader is not reporting the true value of the portfolio being managed: |
|---|
| For each trader:<br>( Sad > 1.5 * Baseline (Sad)<br>OR<br>Shock > 1.5 * Baseline (Shock)<br>)<br>AND<br>P&L within 20% of Baseline (P&L) |

| Manual trading occurs while the trader is not actively looking at his/her screen, suggesting that account spoofing (e.g., someone faking an electronic signature or otherwise pretending to be someone else) might be occurring: |
|---|
| For each trader:<br>Manual Trade<br>AND<br>Attention < 10%<br>AND<br>Baseline (Attention) < 25% |

| A trader being highly agitated during the last 15 minutes of trading hours and continuing in this manner after closing hours, with P&L positions not changing, might indicate that the trader's activity is not being fully reflected in the trade reporting systems: |
|---|
| For each trader:<br>Manual Trade<br>AND<br>Attention < 10%<br>AND<br>Baseline (Attention) < 25% |

| Exact correlations between the high attention readings of two traders, who also have more than two time and size (e.g., price and volume) synchronized trades, may be attempting "1, 2, 3, go" synchronized trading: |
|---|
| Trader_X.Attention within 10% of Trader_Y.Attention<br>AND<br>Trader_X.Attention > 70%<br>AND<br>Trade (Trader_X) .Price within 10% of Trade (Trader_Y) .Price<br>AND<br>Trade (Trader_X) .Volume within 10% of Trade (Trader_Y) .Volume<br>ALL WITHIN 2 second WINDOW |

| A trader continues manual trading but is not recognized by the visual analysis system as the person sitting in their allocated seat. If the trader is not at his/her trading desk, he/she might otherwise be culpable-but because of the deeds of someone else. While logged in, the trades are authenticated against the (missing) trader and otherwise untraceable. A single trade may also go unnoticed by the original (missing) trader until a later date. Inappropriate resource utilization and/or spoofing may be taking place: |
|---|
| For each trader:<br>Manual Trade<br>AND<br>ID < 10% |

| An unusual trade volume, instrument, or venue correlated with an unusual emotion (based on moving averages) for a given trader might not be considered an incident worth investigation if considered as an individual event, but the correlation of two or more might suggest that a deeper investigation is warranted: |
|---|
| For each trader:<br>(<br>Happy outside 50% of Baseline (Happy)<br>OR<br>Sad outside 50% of Baseline (Sad)<br>OR<br>Anger outside 50% of Baseline (Anger)<br>OR<br>Shock outside 50% of Baseline (Shock)<br>OR<br>Agitated outside 50% of Baseline (Agitated)<br>)<br>AND<br>(<br>Trade.instrument NOT in History(trader, instruments)<br>OR<br>Trade.venue NOT in History(trader, venue)<br>OR<br>Trade.volume >History(trader, venue) .All_Values<br>)<br>ALL WITHIN 30 second WINDOW |

| A decreasing trading performance (e.g., lowering P&L, increasing risk value, etc.) correlated with an increasing anxiety, followed by trading performance suddenly improving with anxiety remaining the same, may suggest that the losses incurred may have been hidden: |
|---|
| For each trader:<br>(<br>Gradient ( P&L ) < 0%<br>AND<br>Gradient ( Risk ) < 0%<br>AND<br>Gradient ( Anxiety ) > 0%<br>)<br>FOLLOWED-BY<br>(<br>Gradient ( P&L ) > 30%<br>AND<br>Gradient ( Risk ) > 30%<br>AND<br>Anxiety within 20% of Baseline ( Anxiety )<br>)<br>ALL WITHIN 1 hour WINDOW |

Example Context Scenarios

Context scenarios may be thought of as logical sequences that help provide additional context in the investigation stage of an incident. Context scenarios may, for example, be thought of as additional questions that can be asked during an investigation of an incident. Quantitative data may be recorded and added to the investigative context set to facilitate such investigations. For instance, the emotional state of the traders in question may be added to the set of data used to identify a possible illicit trade (or set of trades). Consideration may be given in cases where suspicion already exist, but where there is insufficient evidence to trigger a preventative action in real-time. Context scenarios thus may be processed automatically or manually (but in some cases as soon as possible after a suspected incident).

In certain example embodiments, if a given trader's metrics are in-line with his/her moving averages and that of his/her peers, then there might not be anything readily apparent to be discerned from a given context scenario—but if not, there might be some evidence further tying a trader to an incident and/or fraudulent event. Several example context scenarios are set forth below, although it will be appreciated that other context scenarios may be defined and implemented in different example embodiments. Similar to above, each table reflects a different context scenario that may be implemented, with the first row providing a description of the question(s) being asked and with the second row providing a simple pseudo-code implementation.

---

Was there a spike in any emotion at the time of the activity (many causal options)? Happy, sad, or agitated might indicate that something caused an emotional reaction (e.g., guilt or relief).

---

For each trader:
   ( Happy > 1.5 * Baseline (Happy)
   OR
   Sad > 1.5 * Baseline (Sad)
   OR
   Anger > 1.5 * Baseline (Anger)
   OR
   Shock > 1.5 * Baseline (Shock)
   OR
   Agitated > 1.5 * Baseline (Agitated)
   )

---

Was there a spike in any emotion at the time of the activity that is not also encountered by any of a given trader's peers? For instance, although there may be many causal options for spikes in emotions, is there anything that differentiates the given trader from his/her peers, thereby suggesting that there is something unusual and potentially worth investigating further?

---

For each Trader:
   For each Emotion type: e
   ( e > 1.5 * Baseline (e) )
   AND NOT
   ( AVERAGE (All Traders (e) )     > 1.5 *
   AVERAGE (All Traders (Baseline(e) )

---

Was the trader's anxiety higher than normal, or was it higher than his/her peers (possibly suggesting an agitated state at the time of the incident)?

---

For each Trader:
   Anxiety > 1.5 * Baseline (Anxiety)
   OR
   Anxiety > 1.2 * AVERAGE (All Traders, Baseline (Anxiety) )

---

Was the trader avidly paying attention at the time of an incident and for some minutes before it (which might indicate a deliberate focus on and potential precognition of a particular incident)?

---

For each Trader:
   Attention > 80%
   Within (30 seconds before, 30 seconds after)

---

It will be appreciated that social media posts, message content, etc., may be used to infer emotional attributes that may inform detect scenarios, context scenarios, and/or the like, at least in some instances. For instance, the tone of messages may be rated automatically or manually, e.g., using binary and/or fuzzy ratings similar to as described above.

Furthermore, in certain example embodiments, the mere fact that a message has been posted, a call has been made, and/or the like, may be taken into account, e.g., to help uncover more complex attempts to disguise collusion and/or the like. For instance, a conspirator might telephone a co-conspirator when a particular trade has happened, and the more direct evidence of the call could be used in connection with a detect scenario quite easily. However, in a more complicated scenario, a conspirator might Tweet after certain activities are undertaken to signal the co-conspirator to act in a certain way. Although the Tweets might look innocent or unconnected, by correlating them with times and/or other indicia of wrongdoing (e.g., emotional data, etc.) and the activities of suspected co-conspirators, this information may indicate wrongdoing, e.g., when examined in context scenarios and/or the like.

Figure 3:
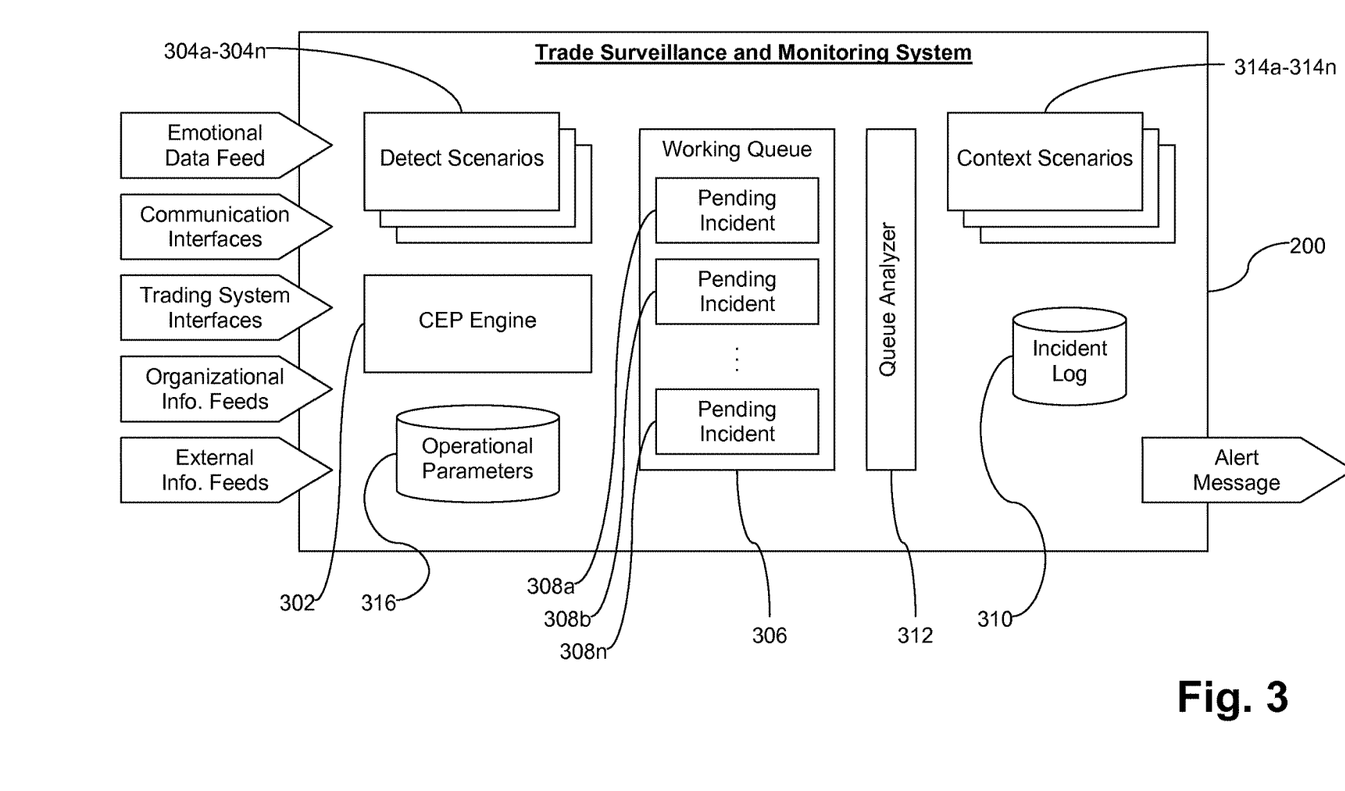
FIG. 3 is a block diagram of an example trade surveillance and monitoring system in accordance with certain example embodiments.
Figure 4:
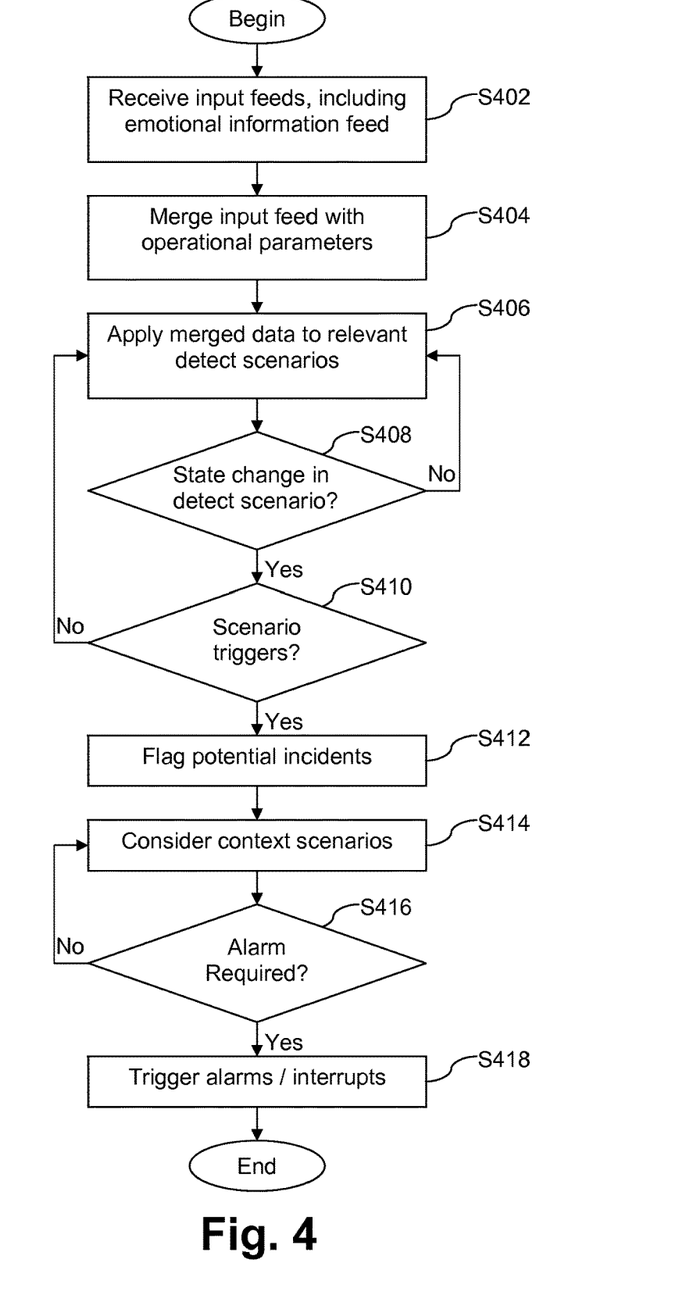
FIG. 4 is a flowchart showing how an example trade surveillance and monitoring system may run in accordance with certain example embodiments.

FIG. 3 is a block diagram of an example trade surveillance and monitoring system 200 in accordance with certain example embodiments, and FIG. 4 is a flowchart showing how the FIG. 3 system 200 may run in accordance with certain example embodiments. The system 200 receives feeds of information, e.g., from the sources shown in FIG. 3 and discussed in greater detail above in connection with FIG. 2 (step S402). One or more event busses may facilitate the receipt of events corresponding to elements in the respective feeds, e.g., for subsequent processing by an event-based processing engine. The input feed(s) may be merged and/or considered with operational parameters (step S404). Furthermore, in the FIG. 3 example, a CEP engine 302 processes the incoming events received over the feeds in accordance with predefined detect scenarios 304a-304n. That is, merged data is applied to and/or considered with the relevant detect scenario(s) (step S406).

The detect scenarios 304a-304n may be defined in a CEP query language or the like. If an incident is detected based on the detect scenarios 304a-304n (steps S408 and S410), it may be added to a working queue 306 of pending incidents 308a-308n for potential follow-up (step S412). If there is no detect scenario applicable, the process may wait for further input. The detected incident also may be written to an incident log 310. The CEP engine 302 and/or another processor may calculate aggregated emotional data, baseline and/or gradient information, etc., for use in connection with the evaluation of the detect scenarios 304a-304n. A database or other data store may associate individuals with their corresponding emotional data such as, for example, current scores, baseline and/or gradient data, historical scores, etc. Similarly, a database or other data store may aggregate such data for groups of individuals, as appropriate. In certain example embodiments this data may be updated at predefined intervals, upon the receipt of a new event over an interface, when a scenario is being run, etc. In certain example embodiments, this information may be calculated in real-time and on an as-needed basis.

The working queue 306 may be implemented as a first-in-first-out (FIFO) queue in certain example embodiments. In certain other example embodiments, the working queue 306 may be implemented as a priority queue. With respect to the latter, for example, the detect scenarios 304a-304n may assign scores to the incidents. The scores may be based on potential degree of severity, likelihood of there actually being a problem, etc. A straightforward calculation involving the multiplication of severity and likelihood is one example scoring mechanism, although others are of course possible in different example implementations. A scoring mechanism such as this may help the system 200 prioritize between higher likelihood incidents with low potential impacts (e.g., a trader being a little late with a negative P&L report) and lower likelihood incidents with high potential impacts (e.g., a full-blown Ponzi Scheme affecting hundreds of people and millions of dollars). The scoring may in certain example embodiments help to provide a normalized means of comparing potential incidents.

Certain incidents may have a score that is sufficiently low as to allow them to be processed "off-line" (e.g., after the fact). The threshold for such scores may be defined by an authorized user. The scoring mechanism may be specified on a detect scenario by detect scenario basis, for a collection of detect scenarios, on a system-wide basis, etc. In certain example embodiments, incidents in a pending queue may be maintained for later analysis of scenarios, e.g., such that the appearance of a significant number of number of weak alerts (which individually might not be sufficient to trigger an alert) over a short time period is sufficient to trigger some further action (e.g., a follow-up investigation action, a temporary hold on a transaction, etc.).

The detect scenarios 304a-304n may in some instances assign timestamps or "time-to-live" values to incidents. This may be useful, for example, to help weed out past incidents that have been resolved in one form or another (e.g., a trader being late with a negative report but nonetheless filing it within a prescribed period plus some nominally (though not strictly) acceptable delta of, for instance, 4 hours; the statute of limitations running after several years; etc.). The queue analyzer 312 may assist in assessing the time-to-live values and curating the working queue 306, as appropriate. For instance, the queue analyzer 312 may remove expired indictments based on comparisons between their time-to-live values and a current time.

In certain example embodiments, the queue analyzer 312 may reorder the queue as scores are updated, e.g., as more information becomes available, as detect scenarios 304a-304n are potentially re-run on data, as time-to-live values near their expiry, etc. For instance, if a first incident is flagged for follow-up, and other incidents are determined to be related to it, those related incidents might have their scores updated by the CEP engine 302 or the like. As another example, a "cold case" (e.g., a case with a time-to-live value that is about to expire) might be reopened and considered. The queue analyzer 312 thus may reorder the queue, as appropriate.

The queue analyzer 312 also may work with the CEP engine 302 to apply context scenarios 314a-314n to pending incidents as appropriate (step S414). For instance, the queue analyzer 312 may de-queue the top pending incident 308a and allow it to be subjected to context scenarios 314a-314n. The context scenarios 314a-314n, like the detect scenarios 304a-304n, may assign scores to the incidents being examined, flag them for follow-up, etc. A second working queue and/or a second queue analyzer may be provided to aid in these and/or other respects. Information generated by the context scenarios 314a-314n also may be logged, e.g., in the incident log 310 in association with the related incident to which the context scenarios 314a-314n is being applied.

In certain example embodiments, the detect scenarios 304a-304n and/or the context scenarios 314a-314n may be re-run and/or the working queue 306 may be re-ordered via a CEP query that is executed each time a new incident is received, a feed update is received, and an internal timer event is triggered, etc.

In certain example embodiments, pending incidents may be held within the working queue 306 for at least a predetermined minimum amount of time, e.g., unless a given received incident is to be further processed immediately (e.g., has a high score above a predefined threshold), in which case the incident may bypass the queue 306 and be forwarded on for further processing by the context scenarios 314a-314n, etc.

Although not shown in FIG. 3, certain example embodiments may include a secure portal through which authorized individuals, regulators, and/or others may access the system. A determination as to whether an alarm should be raised may be made (step S416). Alarms may be triggered, notifications may be generated, trade interrupts may be put into place, etc., potentially in real-time (step S418). If no alarm is required, further context scenarios may be considered, and/or the process may wait for further input to stream in.

It will be appreciated that certain example embodiments may externalize certain operational parameters of the detect and/or context scenarios. This may, for example, allow for simple "on-the-fly" manipulation of the behavior of the trade surveillance and monitoring system 200. For example, rather than use a fixed value of 15 minutes for baseline and/or gradient related calculations, it is possible to make this value changeable via an operational GUI, through which authorized users can change the parameter in real-time without having to modify the relevant scenario itself. As another example, the weights assigned to, and/or definitions of, aggregated states may be parameterized. Operational parameters 316 thus may be stored in a non-transitory computer readable storage medium, and they may be associated with one or more scenarios, as appropriate.

Lessons from detect and/or context scenario analysis may help enforcement and/or monitoring officials understand and improve the more fully autonomous real-time scenarios, e.g., to continually add new more fully automated surveillance scenarios that take into account trader emotional state and/or other data feed information. Certain example embodiments may incorporate a learning mechanism and feed back data on the effectiveness of detect and context scenarios, e.g., to rate such scenarios in terms of accuracy, suggest whether old scenarios should be removed, suggest whether new scenarios should be added (and potentially what data should be analyzed therein), whether scenarios should be re-weighted, etc.

Although certain example embodiments have been described in connection with markets, trading, and related industries, it will be appreciated that the example techniques set forth herein may be used in other contexts. For instance, it might be desirable to consider quantified streams of emotional and/or other more subjective streams in verifying the actions of anyone who owes a fiduciary duty to another such as, for example, lawyers, doctors, accountants, bank tellers, etc. Lawyers could be monitored during time entry operations, doctors could be monitored while filling out insurance forms, accountants could be monitored when counseling clients on tax shelters, bank tellers could be monitored at counters, etc. In certain example embodiments, health, chemical, and/or other inspectors may be monitored, e.g., using the example techniques set forth herein. Detection and context operations may be performed in real-time and/or at later times, e.g., as more data becomes available. Indeed, as indicated above, information sources may be provided synchronously and/or asynchronously in different cases.

Although certain example embodiments are discussed in connection with "real-time" functionality, it will be appreciated that there may be some practical and/or unavoidable delays in some instances. Thus, real-time functionality may be understood to include substantially real-time functionality, functionality that is as close to real-time as possible, functionality that is not intentionally delayed or only insignificantly delayed for some reason, etc.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A surveillance system, comprising:
processing resources including at least one processor;
a first interface over which quantified representations of inferred emotional states of one or more individuals are electronically receivable; and
a second interface over which representations of activities undertaken by one or more individuals are electronically receivable;
wherein the processing resources are configured to at least:
dynamically perform a set of first pre-programmed scenarios in real-time as events continue to stream into the system via the first and second interfaces to determine whether an incident might be occurring or might have occurred, each said first scenario being implemented as a computer-executable logic sequence that takes into account at least an aspect of a representation of an activity or an aspect of a representation of an inferred emotional state, at least one of said first scenarios taking into account both an aspect of a representation of an activity undertaken by at least one given individual and an aspect of a representation of an inferred emotional state of the at least one given individual, performance of the first scenarios assigning scores to incidents;
in response to a determination that a given incident might be occurring or might have occurred with a likelihood greater than a predetermined threshold:
add a record of the given incident to a queue of incidents, wherein records are added into the queue of incidents so as to be ordered by score; and
transmit a signal to a computing system monitored by and external to the surveillance system to cause the computing system to at least temporarily halt an electronically-mediated action that is related to the incident and being undertaken by the computing system before that action can be completed; and
perform, for those incidents having records in the queue of incidents and in an order defined by the queue of incidents, a set of second pre-programmed scenarios to determine with greater certainty whether those incidents might be occurring or might have occurred, each said second scenario being implemented as a computer-executable logic sequence, the first and second scenarios being stored to a data store and being different from one another;
wherein aspects of representations of inferred emotional states include (a) quantifications of perceived subjective emotional feelings including happiness, sadness, anger, shock, or agitation themselves; or (b) results from computations applied thereto; and
wherein computations applicable to representations of inferred emotional states in determining aspects thereof include aggregation calculations that include aspects of representations of two or more inferred emotional states.

2. The system of claim 1, wherein representations of activities include trade-related activities and metadata associated therewith, the trade-related activities taking place on a regulated financial market.

3. The system of claim 1, wherein aspects of representations of activities include trade-related activities themselves or results from computations applied thereto.

4. The system of claim 1, wherein representations of inferred emotional states include quantifications of perceived subjective emotional feelings of individuals derived from a video of said individuals.

5. The system of claim 1, wherein computations applicable to representations of inferred emotional states in determining aspects thereof include emotional baseline or gradient calculations.

6. The system of claim 1, wherein computations applicable to representations of inferred emotional states in determining aspects thereof include aggregation calculations that include aspects of representations of two or more inferred emotional states and corresponding weights applied thereto.

7. The system of claim 1, wherein at least some quantifications of at least some perceived subjective emotional feelings are provided on a scale of 0-100%.

8. The system of claim 1, wherein representations of inferred emotional states and activities are received for a plurality of individuals distributed across a plurality of institutions.

9. The system of claim 8, wherein at least one of the first or second scenarios further takes into account information gleaned from outside of the institutions.

10. The system of claim 9, wherein the information gleaned from outside of the institutions includes quantified representations of inferred emotional states that are based on social media messages.

11. The system of claim 1, wherein the processing resources are configured to at least temporarily halt a trade before the trade can be acted on by a financial market.

12. The system of claim 1, wherein the first and second scenarios are performed in connection with a complex event processing (CEP) engine executing CEP queries.

13. The system of claim 1, wherein scores for the incidents represented in the queue of incidents are updatable over time through repeat execution of the first or second scenarios.

14. The system of claim 1, wherein incidents represented in the queue of incidents having scores below a defined severity level are flagged for offline follow-up.

15. A method of conducting surveillance in connection with a computer system that monitors trades made by individuals in connection with at least one market, the method comprising:
receiving, over a first electronic interface of the computer system, quantified representations of inferred emotional states of one or more of the individuals;
receiving, over a second electronic interface of the computer system, representations of activities undertaken by one or more of the individuals;
dynamically performing, using at least one processor, a set of first predefined scenarios in real-time as events continue to stream in to the computer system via the first and second interfaces, to determine whether an illicit incident might be occurring or might have occurred in connection with the trades, each said first scenario being representable as program logic that includes at least an aspect of a representation of an activity or an aspect of a representation of an inferred emotional state, at least one of said first scenarios including both an aspect of a representation of an activity undertaken by at least one given individual and an aspect of a representation of an inferred emotional state of the at least one given individual, the first scenarios being stored to a non-transitory computer readable storage medium, performance of the first scenarios assigning scores to illicit incidents;
in response to a determination that a given illicit incident might be occurring or might have occurred with a likelihood greater than a predetermined threshold:
adding a record of the given illicit incident to a queue of illicit incidents, wherein records are added into the queue of illicit incidents so as to be ordered by score; and
transmitting a signal, using the at least one processor, to at least temporarily halt an electronically-mediated action that is related to the illicit incident and currently being undertaken by a computing device monitored by and external to the computer system before that action can be completed; and
performing, for those illicit incidents having records in the queue of illicit incidents and in an order defined by the queue of illicit incidents, using the at least one processor, a set of second predefined scenarios to determine with greater certainty whether those given illicit incidents might be occurring or might have occurred, each said second scenario being representable as program logic, the first and second scenarios being different from one another;
wherein aspects of representations of inferred emotional states include (a) quantifications of perceived subjective emotional feelings including happiness, sadness, anger, shock, or agitation themselves; or (b) results from computations applied thereto; and
wherein computations applicable to representations of inferred emotional states in determining aspects thereof include aggregation calculations that include aspects of representations of two or more inferred emotional states.

16. The method of claim 15, wherein representations of inferred emotional states include quantifications of perceived subjective emotional feelings of individuals derived from a video of said individuals.

17. The method of claim 15, wherein:
aspects of representations of activities include trade-related activities themselves or results from computations applied thereto.

18. The method of claim 17, wherein computations applicable to representations of inferred emotional states in determining aspects thereof include emotional baseline or gradient calculations or aggregation calculations that include aspects of representations of two or more inferred emotional states.

19. The method of claim 18, wherein at least some quantifications of at least some perceived subjective emotional feelings are provided on a scale of 0-100%.

20. The method of claim 15, wherein representations of inferred emotional states or activities are received for a plurality of individuals distributed across a plurality of institutions.

21. The method of claim 20, wherein at least one of the first or second scenarios further takes into account information gleaned from outside of the institutions.

22. The method of claim 15, further comprising using the electronic message to at least temporarily halt a trade associated with the illicit incident before the trade can be acted on.

23. The method of claim 15, wherein:
quantified representations of inferred emotional states correspond to subjective physical trader emotional attributes;
representations of activities undertaken relate to objective trade-related activity events and associated measures;
the first predefined scenarios define respective types or patterns useful in detecting inappropriate trade-related incidents in connection with data types receivable over at least the first electronic interface, the first predefined scenarios being performable using a complex event processing (CEP) engine;
the second predefined scenarios incorporate data types from the first or second electronic interfaces to provide additional context in investigating incidents detected using the first logical sequences; and
further comprising generating trade interrupt signals, responsive to the performance of the first or second predefined scenarios so as to at least temporarily prevent a trade-related activity otherwise scheduled for execution by the computing device that is external to the computing system.

24. A non-transitory computer readable storage medium tangibly storing instructions that, when executed, perform surveillance in connection with a computer system that monitors trades made by individuals in connection with at least one market by at least:

enabling reception, over a first electronic interface of the computer system, of quantified representations of inferred emotional states of one or more of the individuals;

enabling reception, over a second electronic interface of the computer system, of representations of activities undertaken by one or more of the individuals;

dynamically performing a set of first predefined scenarios in real-time as events continue to stream in to the computer system via the first and second interfaces, to determine whether an illicit incident might be occurring or might have occurred in connection with the trades, each said first scenario being representable as computer-executable program logic that includes at least an aspect of a representation of an activity or an aspect of a representation of an inferred emotional state, at least one of said first scenarios including both an aspect of a representation of an activity undertaken by at least one given individual and an aspect of a representation of an inferred emotional state of the at least one given individual;

in response to a determination that a given illicit incident might be occurring or might have occurred with a likelihood greater than a predetermined threshold:
  adding a record of the given illicit incident to a queue of illicit incidents, wherein the queue of illicit incidents is operated as a priority queue, and wherein records are added into the queue of illicit incidents based on severity or likelihood values associated therewith; and transmitting an interrupt signal to at least temporarily halt an action that is related to the given illicit incident and is being executed by a separate computer system before it can be completed, in response to a determination that the given illicit incident might be occurring or might have occurred with certainty greater than a predefined threshold; and performing, for those illicit incidents having records in the queue of illicit incidents and in an order defined by the queue of illicit incidents, a set of second predefined scenarios to determine with greater certainty whether those given illicit incidents might be occurring or might have occurred, each said second scenario being representable as computer-executable program logic, the first and second scenarios being different from one another;

wherein aspects of representations of inferred emotional states include (a) quantifications of perceived subjective emotional feelings including happiness, sadness, anger, shock, or agitation themselves; or (b) results from computations applied thereto; and wherein computations applicable to representations of inferred emotional states in determining aspects thereof include aggregation calculations that include aspects of representations of two or more inferred emotional states.

* * * * *